United States Patent
Lee et al.

(10) Patent No.: US 6,456,741 B1
(45) Date of Patent: Sep. 24, 2002

(54) STRUCTURE-GUIDED IMAGE MEASUREMENT METHOD

(76) Inventors: Shih-Jong J. Lee, 15418 SE. 53rd Pl., Bellevue, WA (US) 98006; Seho Oh, 5229 107th St. SW., Mukilteo, WA (US) 98275

( * ) Notice: Subject to any disclaimer, the term of this patent is extended or adjusted under 35 U.S.C. 154(b) by 117 days.

(21) Appl. No.: 09/739,084

(22) Filed: Dec. 15, 2000

(51) Int. Cl.$^7$ ................................ G06K 9/46
(52) U.S. Cl. .......................... 382/190; 382/220
(58) Field of Search ............................. 382/290, 291, 382/215, 181, 117, 124, 217, 153, 141, 190, 205, 220; 318/577, 568.1

(56) References Cited

U.S. PATENT DOCUMENTS

| | | | |
|---|---|---|---|
| 5,005,147 A | * | 4/1991 | Krishen et al. ............. 364/578 |
| 5,231,580 A | * | 7/1993 | Cheung et al. ......... 364/413.13 |
| 5,528,703 A | * | 6/1996 | Lee ............................ 382/257 |
| 5,689,585 A | * | 11/1997 | Bloomberg et al. ......... 382/229 |

* cited by examiner

Primary Examiner—Andrew W. Johns
Assistant Examiner—Seyed Azarian

(57) ABSTRACT

Structure-guided image estimation and measurement methods are described for computer vision applications. Results of the structure-guided estimation are symbolic representations of geometry entities such as lines, points, arcs and circles. The symbolic representation facilitates sub-pixel measurements by increasing the number of pixels used in the matching of image features to structural entities, improving the detection of structural entities within the image, weighting the contribution of each image sample to the measurement that is being made and optimizing that contribution.

After the structure-guided estimation, geometric entities are represented by their symbolic representations. Structure-guided measurements can be conducted using the symbolic representation of the geometric entities. Measurements performed from the symbolic representation are not limited by image resolution or pixel quantization error and therefore can yield sub-pixel accuracy and repeatability.

20 Claims, 23 Drawing Sheets

STRUCTURE-GUIDED IMAGE MEASUREMENT METHOD

U.S. PATENT REFERENCES

1. U.S. Pat. No. 5,315,700 entitled, "Method and Apparatus for Rapidly Processing Data Sequences", by Johnston et. al., May 24, 1994.
2. U.S. Pat. No. 6,130,967 entitled, "Method and Apparatus for a Reduced Instruction Set Architecture for Multidimensional Image Processing", by Shih-Jong J. Lee, et. al., Oct. 10, 2000.
3. Pending Application Ser. No. 08/888,116 entitled, "Method and Apparatus for Semiconductor Wafer and LCD Inspection Using Multidimensional Image Decomposition and Synthesis", by Shih-Jong J. Lee, et. al., filed Jul. 3, 1997.
4. U.S. Pat. No. 6,122,397 entitled, "Method and Apparatus for Maskless Semiconductor and Liquid Crystal Display Inspection", by Shih-Jong J. Lee, et. al., Sep. 19, 2000.
5. U.S. Pat. No. 6,148,099 entitled, "Method and Apparatus for Incremental Concurrent Learning in Automatic Semiconductor Wafer and Liquid Crystal Display Defect Classification", by Shih-Jong J. Lee et. al., Nov. 14, 2000.

CO-PENDING U.S. PATENT APPLICATIONS

1. U.S. patent application Ser. No. 09/693723, "Image Processing System with Enhanced Processing and Memory Management", by Shih-Jong J. Lee et. al, filed Oct. 20, 2000.
2. U.S. patent application Ser. No. 09/693378, "Image Processing Apparatus Using a Cascade of Poly-Point Operations", by Shih-Jong J. Lee, filed Oct. 20, 2000.
3. U.S. patent application Ser. No. 09/692948, "High Speed Image Processing Apparatus Using a Cascade of Elongated Filters Programmed in a Computer", by Shih-Jong J. Lee et. al., filed Oct. 20, 2000.
4. U.S. patent application Ser. No. 09/703018, "Automatic Referencing for Computer Vision Applications", by Shih-Jong J. Lee et. al, filed Oct. 31, 2000.
5. U.S. patent application Ser. No. 09/702629, "Run-Length Based Image Processing Programmed in a Computer", by Shih-Jong J. Lee, filed Oct. 31, 2000.
6. U.S. Patent Application entitled, "Structure-guided Image Processing and Image Feature Enhancement" by Shih-Jong J. Lee, filed Dec. 15, 2000.

REFERENCES

1. Draper N R and Smith H, "Applied Regression Analysis", John Wiley & Sons, Inc., 1966, PP. 7–13.
2. Duda, R O and Hart P E, "Pattern Classification and Scene Analysis," John Wiley and Sons, New York, 1973, PP. 332–335.
3. Haralick R M and Shapiro, L G, "Survey Image Segmentation Techniques," Comput. Vision, Graphics Image Processing, vol. 29: 100–132, 1985.
4. Silver, B, "Geometric Pattern Matching for General-Purpose Inspection in Industrial Machine Vision", Intelligent Vision '99 Conference—June 28–29, 1999.

TECHNICAL FIELD

This invention relates to high accuracy image processing, specifically to an improved method for measuring objects in an image with sub-pixel accuracy and repeatability.

BACKGROUND OF THE INVENTION

Many computer vision applications require accurate and robust measurements of image features to detect defects or gather process statistics. The capability of a computer vision system is often characterized by its detection/measurement accuracy, repeatability and throughput. It is desirable to achieve sub-pixel measurement accuracy and repeatability for many computer vision applications.

Application domain knowledge is available in most computer vision applications. The application domain knowledge can often be expressed as structures of image features such as edges, lines and regions. The structures include spatial relationships of object features such as shape, size, intensity distribution, parallelism, co-linearity, adjacency, etc. The structure information can be well defined in industrial applications such as semiconductor, electronic or machine part inspections. In machine part inspections, most of the work-pieces have available Computer Aided Design (CAD) data that specifies its components as entities (LINE, POINT, 3DFACE, 3DPOLYLINE, 3DVERTEX, LINE, POINT, 3DFACE, 3DPOLYLINE, 3DVERTEX, etc.) and blocks of entities. In biomedical or scientific applications, structure information can often be loosely defined. For example, a cell nucleus is round and different shapes can differentiate different types of blood cells or chromosomes.

Application domain knowledge can significantly improve the measurement capability of a computer vision system. However, it is non-trivial to efficiently use the application domain knowledge in high precision applications that require sub-pixel accuracy, repeatability and real-time throughput.

PRIOR ART

An image segmentation approach is used in the prior art for image feature detection or measurement. The image segmentation approach converts a grayscale image into a binary image that contains object of interest masks. Binary thresholding is a common technique in the image segmentation approach (Haralick R M and Shapiro, L G, "Survey Image Segmentation Techniques," Comput. Vision, Graphics Image Processing, vol. 29: 100–132, 1985).

Image features such as edges in an image are smeared over a distance of four or five pixels, an effect that is the result of a reasonably sufficient sampling basis, imperfections in the camera optics, and the inevitability of physical laws (finite point spread function). Because edges or features of an image are imaged by the optical and imaging system as continuously varying gray levels, there exists no single gray level that represents edge pixels. For this reason, any system that depends on segmentation or a binary thresholding of the image before critical dimensions are determined must necessarily introduce quantization errors into the measurement. Binary thresholding also exacerbates the resolution limiting effect of system noise. Pixels whose gray levels are close to the threshold level are maximally affected by small variations due to additive noise. They may either be included or excluded into the mask based on the noise contribution to their instantaneous value. These pixels are frequently located on the periphery of the part, or a substructure of the part, where they have maximal disruption of the derived measurement values.

Prior art (Silver, B, "Geometric Pattern Matching for General-Purpose Inspection in Industrial Machine Vision", Intelligent Vision '99 Conference—Jun. 28–29, 1999) applies application domain structure information using a template matching method. An image of the object to be located (the template) is stored. The template is compared to similar sized regions of the image over a range of positions, with the position of greatest match taken to be the position of the object and measurements are conducted between the detected positions. Template matching does not provide sub-pixel accuracy and repeatability since the estimated positions lie in pixel grids that exhibit spatial quantization error due to limitations in pixel pitch. Furthermore, the template matching approach is sensitive to variations such as orientation and size differences between the image and the template. Even within a small range of size and orientation changes, the match value drops off rapidly and the ability to locate and measure image features drops with it.

Prior art applies application domain structure information through a projection/dispersion approach. The projection/dispersion approach integrates (projects) image pixel values over a pre-defined direction in the image. This can be done for binary image (projection) or grayscale image (dispersion) and results in a one-dimensional line of values. The application domain structure information defines the projection directions. However, the prior art approach is sensitive to system variations such as rotation. Rotation effect could result in the integration of pixel values along a wrong direction that is destructive to sub-pixel accuracies. Furthermore, the projection approach cannot effectively combine multiple two-dimensional (or more dimensions) structure information where features of interest are along different directions. Therefore, only a limited number of image pixels (n) are used for feature estimation or measurement. Measurement uncertainty is related to $$\frac{1}{\sqrt{n}}.$$

Smaller n results in bigger uncertainty or lower accuracy.

Certain pixels in image feature region are more indicative than others. However, the prior art approach does not take advantage of this information. Projection treats edge pixels and region pixels with equal weight. Prior Art does not score the reliability of each measurement. Prior Art does not do additional processing to improve accuracy and repeatability on less reliable measurements. This is difficult to accomplish since most prior art measurements are done in an ad hoc fashion.

OBJECTS AND ADVANTAGES

It is an object of this invention to provide sub-pixel image feature estimation and measurement by using structure-guided image processing techniques. The results of the structure-guided estimation is symbolic representation of geometry entities such as lines, points, arcs and circles. The symbolic representation is not limited by image resolution or pixel quantization error and therefore facilitates sub-pixel measurements. The image feature estimation is based on grayscale weights rather than a binary (mask) image.

It is another object of the invention to conduct the estimation in at least two dimensions to avoid error caused by one-dimensional projection and to utilize gray scale processing based on the weighted image within feature transition regions.

A further object of the invention is to guide the image feature estimation by structure constraints defined from application domain knowledge to increase accuracy. Accuracy is increased by using structure constraints to link multiple features for an integrated estimation that utilizes a large number of pixels (large n). Large n reduces the measurement error and increases measurement repeatability.

It is a still further object of the invention to score measurement reliability and guided by the scores, improve accuracy and repeatability using an iterative estimation approach.

It is an object of this invention to allow learning to determine the importance and stability of image pixels and weight important and stable pixels higher in the estimation process.

SUMMARY OF THE INVENTION

This invention provides sub-pixel, high performance image based estimation and measurement through a structure-guided image processing method. In the preferred embodiment, this invention performs two dimensional geometry estimation using images of grayscale weights for each connected component in the measurement mask. The features from which the masks and the weights are derived are described in the co-pending U. S. Patent Application entitled, "Structure-guided Image Processing and Image Feature Enhancement" by Shih-Jong J. Lee, filed Dec. 15, 2000 which is incorporated herein in its entirety.

Results of the structure-guided estimation are symbolic representation of geometry entities such as lines, points, arcs and circles. The symbolic representation facilitates sub-pixel measurements by increasing the number of pixels used in the matching of image features to structural entities, improving the detection of structural entities within the image, weighting the contribution of each image sample to the measurement that is being made and optimizing that contribution.

After the structure-guided estimation, geometric entities are represented by their symbolic representations. Structure-guided measurements can be conducted using the symbolic representation of geometric entities. Measurements performed from the symbolic representation are not limited by image resolution or pixel quantization error and therefore can yield sub-pixel accuracy and repeatability.

DETAILED DESCRIPTION OF THE INVENTION

This description of a preferred embodiment of a structure-guided image measurement method describes a set of detailed processes through which an image processing system can achieve sub-pixel accuracy and repeatability of image feature measurement. This invention performs two dimensional geometry estimation using images of grayscale weights for each connected component in the measurement mask. The estimation is based on grayscale weights rather than a binary image. The estimation is conducted in two dimensions to avoid error caused by one-dimensional projection. The estimation is guided by structure constraints defined from application domain knowledge to increase accuracy. It uses structure constraints to link multiple features for an integrated estimation that utilizes a large number of points (large n). Large n reduces the measurement ambiguity. The results of the structure-guided estimation are symbolic representation of geometry entities such as lines, points, arcs and circles. Alignment of the symbolic geometric entities with their respective image features facilitates robust sub-pixel measurements.

This invention can use learning to determine the stability of image pixels and weigh stable pixels higher in the estimation process. Reliability of measurement is scored. Guided by the scores, accuracy and repeatability is improved using iterative robust estimation.

I. Structure-guided Image Measurement System

Figure 1:
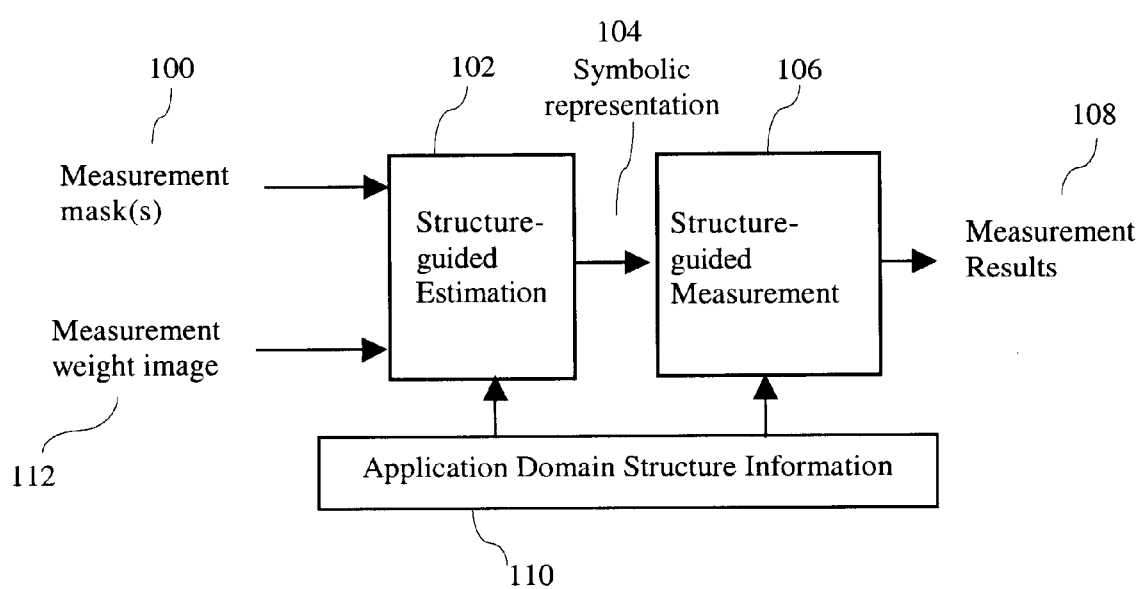
FIG. 1 shows the processing flow of the structure-guided image measurement system.

FIG. 1 shows the processing flow of the structure-guided image measurement system of this invention. As shown in FIG. 1, inputs to the structure-guided image measurement system include measurement mask(s) 100 and a measurement weight image 112. The structure-guided estimation module 102 performs estimation from the weight image 112 within the regions defined by each component of the measurement mask(s) 100. Application domain structure information 110 is encoded into constraints for the structure-guided estimation 102. The structure-guided estimation module creates symbolic representation 104 of geometric entities such as lines, points, arcs and circles. The structure-guided measurements 106 are performed using the symbolic representation to achieve measurement results 108 with sub-pixel accuracy.

Figure 2:
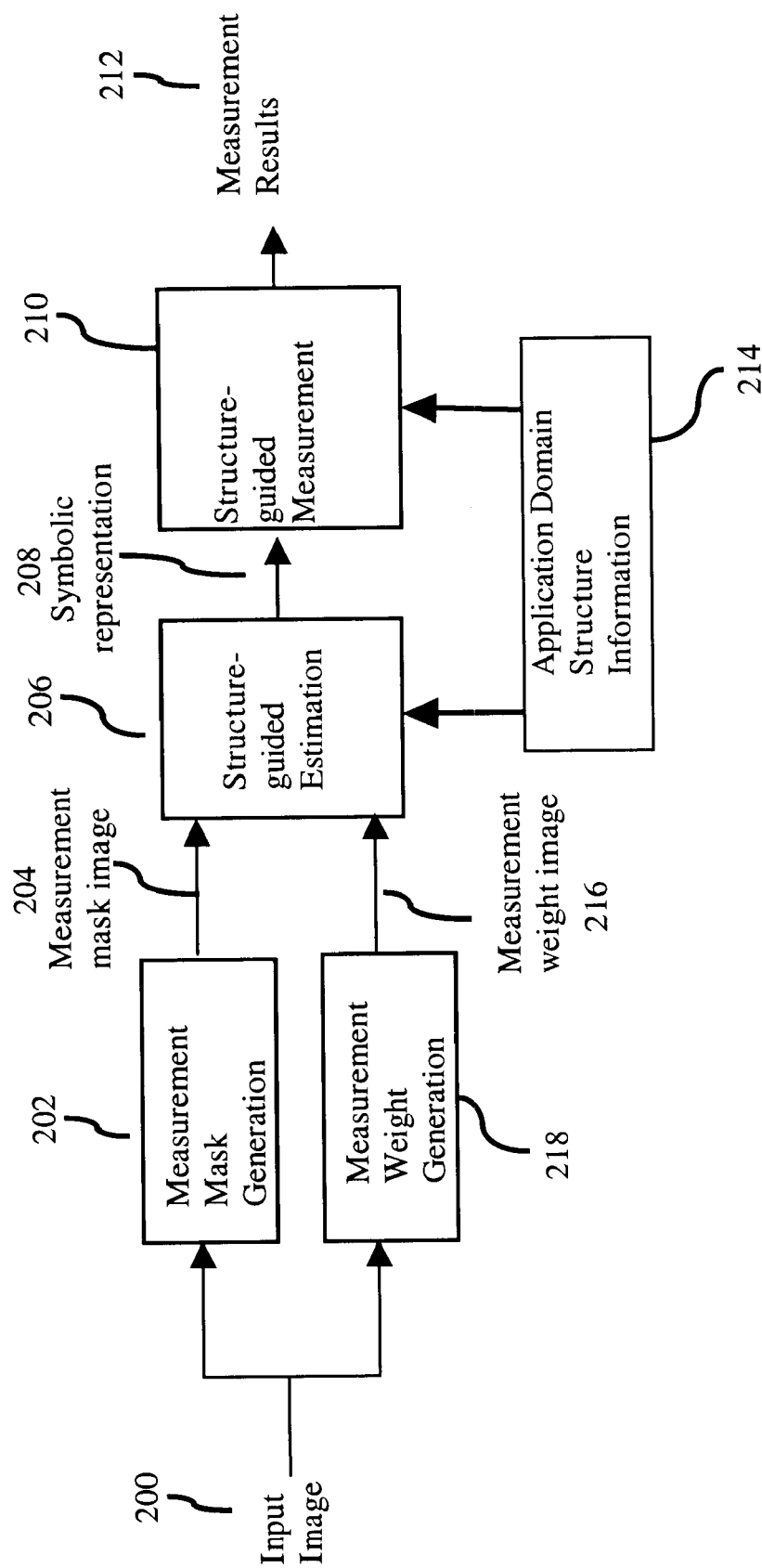
FIG. 2 shows an alternative processing flow of the structure-guided image measurement system.

The measurement mask(s) 204 and measurement weight image 216 can be automatically generated from the input image 200 as shown in FIG. 2. A structure-guided image processing and feature enhancement system that extracts and enhances image features of interest and generates measurement mask(s) and weights from the feature enhanced image is disclosed in a co-pending U.S./Patent Application entitled, "Structure-guided Image Processing and Image Feature Enhancement" by Shih-Jong J. Lee, filed Dec. 15, 2000 which is incorporated herein in its entirety.

II. Structure-guided Estimation

The structure-guided estimation method 206 performs estimation from the weight image 216 within the regions defined by each component of the measurement mask(s) 204. The estimation is conducted by a weighted minimum-square-error (MSE) method. The estimation finds the parameters that minimize a cost function. The cost function is defined as the weighted square error between the structural model (symbolic representation) and all data points of all entities included in the estimation minus an additional structural constraint term. The entities are defined by each component of the measurement mask(s). The corresponding points in the measurement weight image weighs each data point during the estimation process.

$$Cost = \sum_{m \in M} \sum_{i \in C_m} w_i[\text{Model\_Error}(x_i, y_i)]^2 - \text{Additional\_structure\_constraint}$$

Where M is the set of all components in the measurement masks and $C_m$ corresponds to the m-th component of the mask. Model_Error function represents the difference between the structure representation and the real data.

Figure 3:
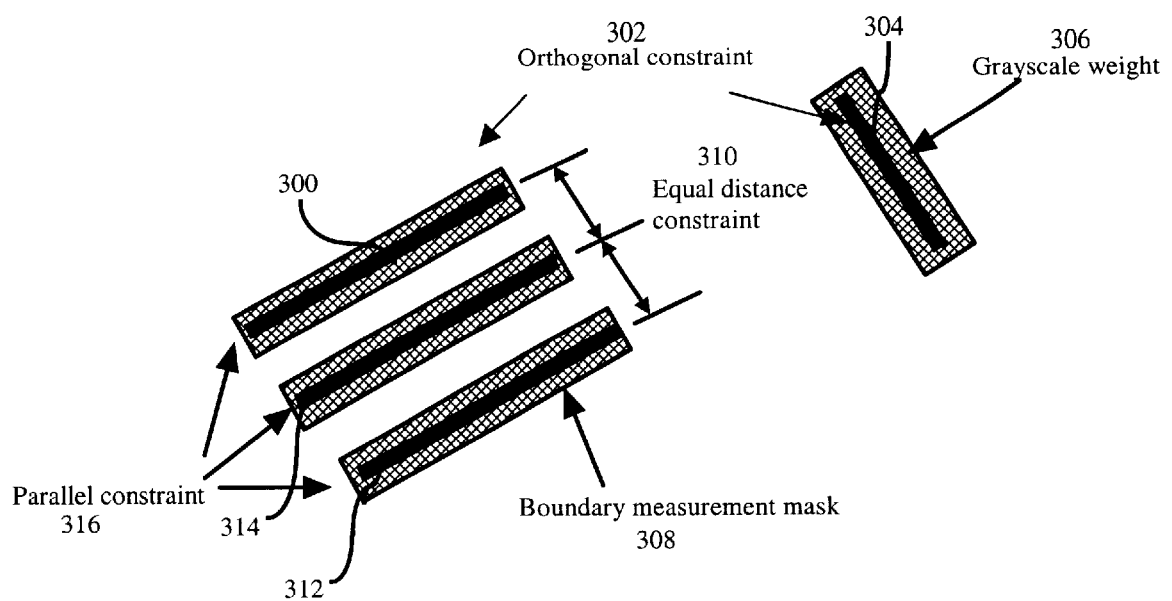
FIG. 3 shows a simple example of the structure-guided estimation method. Three lines are parallel to each other and are equal distance apart. The fourth line is perpendicular to the three lines.

FIG. 3 illustrates a simple example of the structure-guided estimation method of this invention. There are four lines 300, 314, 312, 304 in the example shown in FIG. 3. Each line has a boundary measurement mask 308 that defines the regions to perform estimation using the pixel values in the grayscale weight image 306 shown surrounding each line with a cross hatched pattern. In this figure, the darkest part of the line is shown in the approximate center and indicated by a darkened region. The structure constraints that are used to guide the estimation include a parallel constraint 316 for the three lines 300, 314, 312 on the left of FIG. 3. In addition, an equal distance constraint 310 is also applied to the distances between the adjacent parallel lines. The fourth line 304 is included in the estimation process using an orthogonal constraint 302 that requires that it is perpendicular to the parallel lines. The outputs 208 of the structure-guided estimation method of this invention are the symbolic representation of the four lines. Therefore, the information embedded in the measurement masks and gray scale weight images are transformed into the parameters of the symbolic representation. Measurements performed from the symbolic representation are no longer limited by image resolution or pixel quantization error and therefore can yield sub-pixel accuracy and repeatability. The symbolic representation can also be used with a computer graphic program to display the detected features.

II.1 Symbolic Representation of Geometric Entities

To achieve sub-pixel accuracy, the outputs of the structure-guided estimation module are the symbolic representation of the geometric entities. In one embodiment of the invention, the entities include scale value, point, line, circle and region of interest or arrays (sets) of values, points, lines, circles or regions of interest.

A scale value is represented by a real number. A point location is represented by two integers corresponding to its x and y image coordinates. A line position is represented by a line equation:

$ax+by+c=0$ with the constraint that $a^2+b^2=1$ and $b \geq 0$.

A circle is represented by a circle equation $x^2+y^2+ax+by+c=0$.

The center of the circle is located at $$\left(-\frac{a}{2}, -\frac{b}{2}\right)$$

and the radius of the circle is $$\sqrt{\frac{a^2+b^2}{4} - c}.$$

A rectangular region of interest is represented by its upper-left and lower-right corner points.

Those skilled in the art should recognize that the geometric entities could include other two dimensional curves such as ellipse, parabola, hyperbola, cubic and higher order polynomial functions, spline functions, etc. The region of interest could be generalized into closed polygons. The image coordinates can be transformed into other coordinate systems. Furthermore, the structure-guided estimation of this invention can be generalized to estimate three dimensional or higher dimensional geometric entities by correlating constraints among multiple images (such as stereo image pairs) and can also include such things as color or motion or separate images joined by a known relation (such as an outside image and an inside image).

II.2 Structure-guided Geometric Entity Estimation

The structure-guided estimation module estimates the parameters of the symbolic representation of the geometric entities from the grayscale weight image under the structure constraints. Different structure constraints and combinations of the constraints can be used in the estimation processes. In one embodiment of the invention, constrained weighted least squares estimation is used as the basis for the estimation. The estimation finds the parameters that minimize the weighted square error for all data points of all entities included in the estimation. The corresponding point in the measurement weight image weights each data point during the estimation process. The following sections list some estimation methods in one preferred embodiment of this invention.

A. Structure-guided Line Estimation

A.1 Line Estimation Without Structure Constraints

When no structure constraint is available, the cost function for line m is $$Cost_m = \sum_{i \in L_m} w_i[a_m x_i + b_m y_i + c_m]^2 - \lambda(a^2 + b^2 - 1)$$

Where $L_m$ is the mask region defined for the estimation of line m.

A closed form solution exists for determining $a_m$, $b_m$ and $c_m$ that minimize $Cost_m$. (Draper N R and Smith H, "Applied Regression Analysis", John Wiley & Sons, Inc., 1966, PP. 7–13)

A.2 Line Estimation Constrained by a Given Slope

Figure 4:
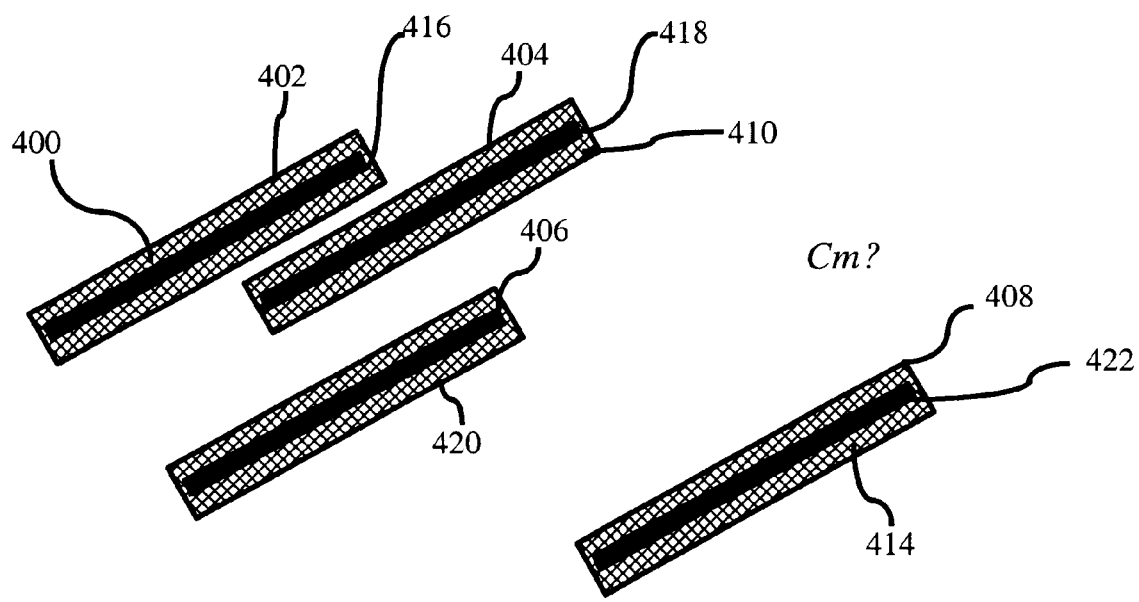
FIG. 4 shows lines with known slope yet unknown intersection $c_m$.

The structure constraint requires all lines 416, 418, 406, 422 have a same slope that is known a priori as shown in FIG. 4. Each line has gray scale weights 400, 410, 412, 414 within a mask region as shown in 402, 404, 420, 408. $C_m$ is not known.

The given slope uniquely defines a and b of the line equations. The cost function is defined as, $$Cost = \sum_{m \in L} \sum_{i \in L_m} w_i[ax_i + by_i + c_m]^2$$

Where L is the set of lines included in the estimation masks; $L_m$ is the mask region defined for line m. A closed form solution exists for determining $c_m$ that minimizes Cost.

A.3 Line Estimation Constrained by a Given Intersection Point

Figure 5:
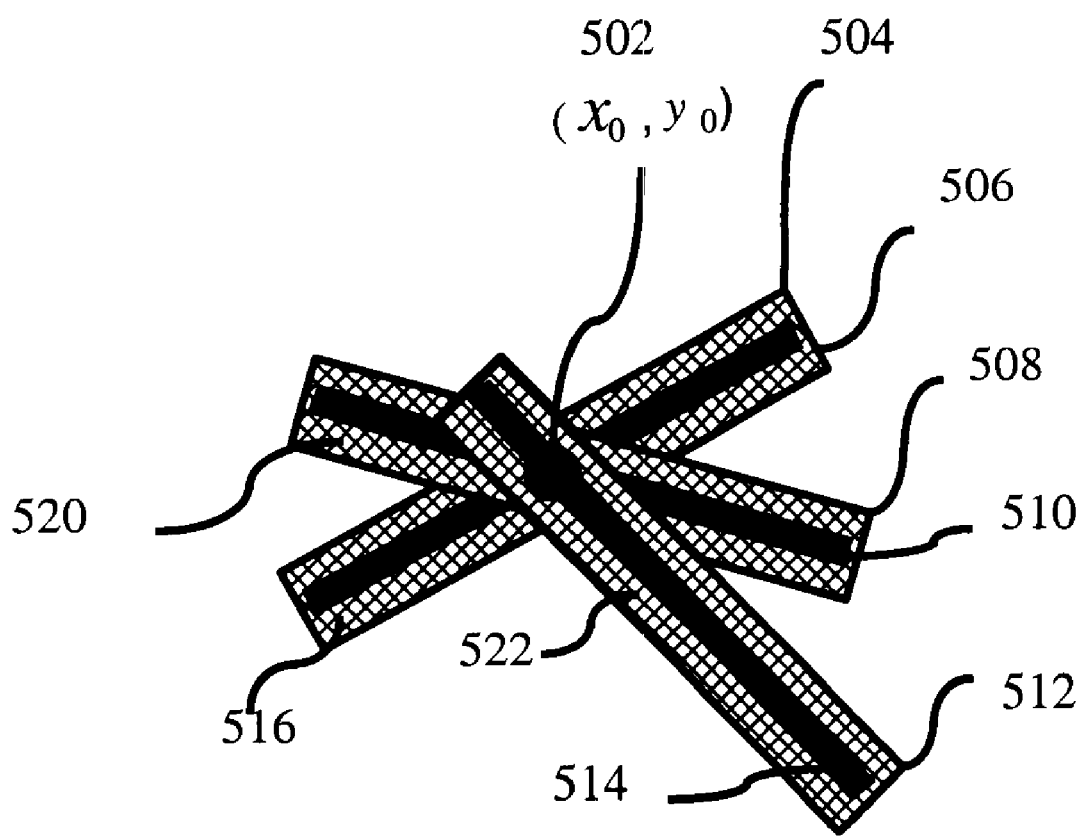
FIG. 5 shows lines that pass a given intersection point ($X_0$, $y_0$).

The structure constraint requires all lines to pass one given intersection point $(X_0, Y_0)$ as shown in FIG. 5. In FIG. 5 the common point of intersection 502 is shown wherein the lines 514, 510, 506 intersect. Each line has grayscale weights 516, 520, 522 within mask region 504, 508, 512.

The cost function is $$Cost = \sum_{m \in L} \left( \sum_{i \in L_m} w_i[a_m(x_i - x_0) + b_m(y_i - y_0)]^2 + \lambda_m(a_m^2 + b_m^2 - 1) \right)$$

Where L is the set of lines included in the estimation masks; $L_m$ is the mask region defined for line m. A closed form solution exists for determining $a_m$ and $b_m$ for each line in L that minimize Cost.

A.4 Line Estimation Constrained by Parallelism and Orthogonal Relations

FIG. 3 shows an example of this case. The structure constraint includes two groups of parallel lines L 300, 314, 312 and P 304. The lines in L and the lines in P are perpendicular to each other as shown in FIG. 3. The cost function is $$Cost = \sum_{m \in L} \sum_{i \in L_m} w_i[ax_i + by_i + c_m]^2 +$$
$$\sum_{n \in P} \sum_{i \in P_n} w_i[bx_i - ay_i + c_n]^2 - \lambda(a^2 + b^2 - 1)$$

A closed form solution exists for determining a, b, $c_m$ and $c_n$ that minimize Cost. When P is an empty set, only a parallel line constraint exists for a set of lines. This is a degenerate form of the structure constraint in this more general case. When only one line each existed in groups L and P, the constraint becomes the existence of two orthogonal lines. This is a degenerate form of the structure constraint in this more general case.

A.5 Line Estimation Constrained by Parallelism and Equal Distance Relations

FIG. 3 shows an example of this case. There is a group of parallel lines L 300, 314, 312 with a common slope corresponding to unknown values a and b. The lines in L can be sequentially ordered from 0 to K by their proximity to each other with the adjacent lines a fixed but unknown distance d apart 310. The cost function is $$Cost = \sum_{m \in L} \sum_{i \in L_m} w_i[ax_i + by_i + md + c_0]^2 - \lambda(a^2 + b^2 - 1)$$

A closed form solution exists for determining a, b, d and $c_0$ that minimize Cost.

A.6 Line Estimation Constrained by Parallelism and a Given Angle Relation

Figure 6:
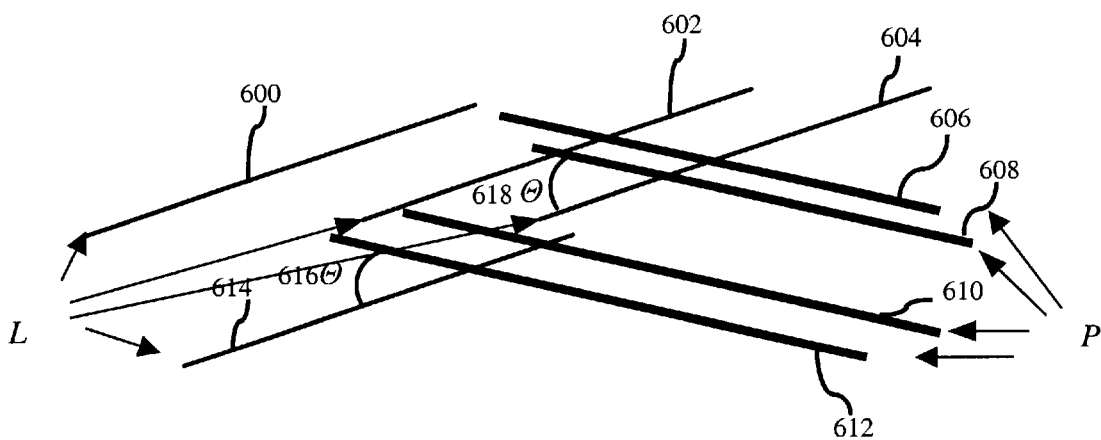
FIG. 6 shows two parallel line groups with a given angle Θ between the groups.

The structure constraint includes two groups of parallel lines L 600, 602, 614, 604 and P 612, 610, 608, 606. The lines in L and the lines in P are intersected with a given angle Θ 618, 616 as shown in FIG. 6.

The cost function is $$Cost = \sum_{m \in L} \sum_{i \in L_m} w_i [ax_i + by_i + c_m]^2 +$$
$$\sum_{n \in P} \sum_{i \in P_n} w_i [cx_i + dy_i + c_n]^2 - \lambda_1 (ac + bd - \cos\Theta) -$$
$$\lambda_2 (a^2 + b^2 - 1) - \lambda_3 (c^2 + d^2 - 1)$$

An iterative optimization method can be used to determine a, b, $c_m$ and c, d, $c_n$ that minimizes Cost.

When only one line each exists in groups L and P, the constraint becomes two lines with an intersection angle Θ. This is a degenerate form of this more general structure constraint.

B. Structure-guided Circle/Circular Arc Estimation

B.1 Circle/Circular Arc Estimation Without Structure Constraints

When no structure constraint is available, the cost function for circle/circular arc m is $$Cost_m = \sum_{i \in C_m} w_i [(x_i^2 + y_i^2) + a_m x_i + b_m y_i + c_m]^2$$

Where $C_m$ is the mask region defined for circle/circular arc m.

A closed form solution exists for determining $a_m$, $b_m$ and $c_m$ that minimize $Cost_m$. The center of the circle/circular arc m is located at $$\left(-\frac{a_m}{2}, -\frac{b_m}{2}\right)$$

and its radius is $$\sqrt{\frac{a_m^2 + b_m^2}{4} - c_m}.$$

B.2 Circle/Circular Arc Estimation Constrained by Center on a Given Line

The structure constraint requires that the center of the circle/circular arc is on a given line $$dx + ey + f = 0$$

Figure 7:
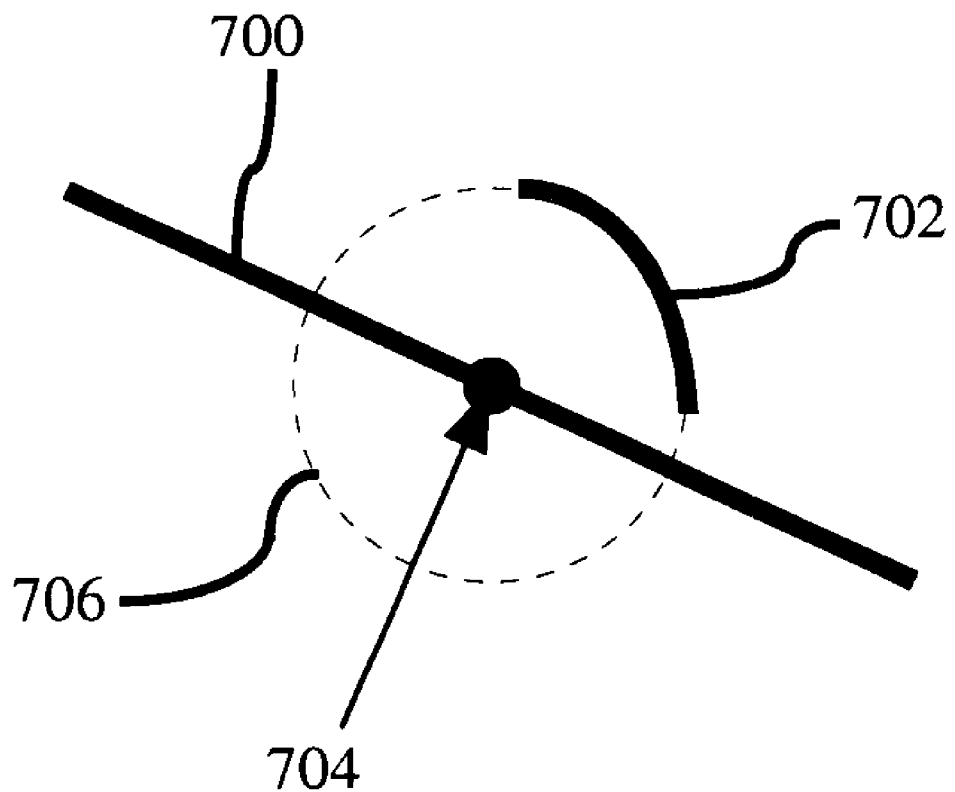
FIG. 7 shows a circle/circular arc with its center on a given line.

This case is shown in FIG. 7. In FIG. 7, a line 700 passes the center 704 of a circle 706. The circle 706 has a circular arc 702. The cost function for the circle/circular arc m is $$Cost_m = \sum_{i \in C_m} w_i [(x_i^2 + y_i^2) + a_m x_i + b_m y_i + c_m]^2 - \lambda(a_m d + b_m e - 2f)$$

A closed form solution exists for determining $a_m$, $b_m$ and $c_m$ that minimize $Cost_m$. The center of the circle/circular arc m is located at $$\left(-\frac{a_m}{2}, -\frac{b_m}{2}\right)$$

and its radius is $$\sqrt{\frac{a_m^2 + b_m^2}{4} - c_m}.$$

Figure 8:
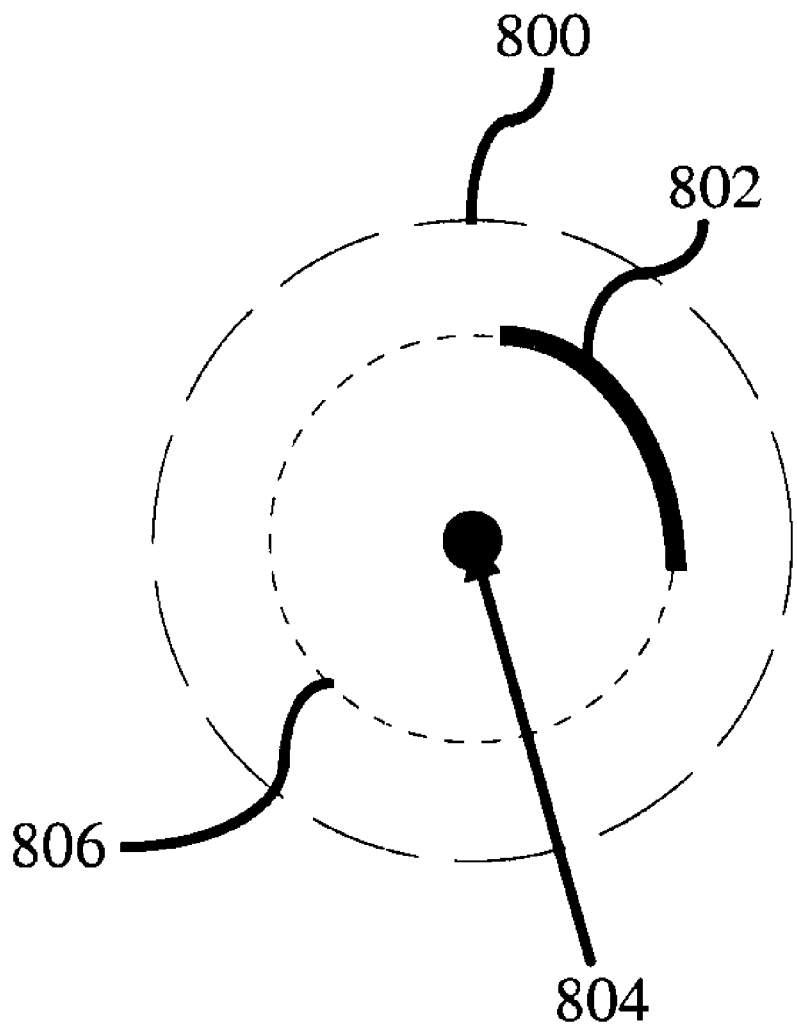
FIG. 8 shows circle(s)/circular arc(s) with a given center point.

B.3 Circle(s)/Circular Arc(s) Estimation Constrained by a Given Center Point The structure constraint gives a fixed center location 804 for the circle(s) 800, 806/circular arc(s) 802 at $(x_c, y_c)$. The estimate is to find radius $r_m$ for each circle/circular arc $C_m$ in the set of circle(s)/circular arc(s) included in the estimation masks. This structure is shown in FIG. 8.

The cost function is $$Cost = \sum_{c_m \in C} \sum_{i \in C_m} w_i [(x_i - x_c)^2 + (y_i - y_c)^2 - r_m]^2$$

Where C is the set of circle(s)/circular arc(s) included in the estimation masks. A closed form solution exists for determining $r_m$ for all m∈C that minimize Cost.

B.4 Circle(s)/Circular Arc(s) Estimation Constrained by the Same Center Point The structure constraint requires that all circle(s)/circular arc(s) have a common unknown center point. This structure is similar to that shown in FIG. 8 with the exception that the common center position is unknown.

The cost function is $$Cost = \sum_{c_m \in C} \sum_{i \in C_m} w_i [(x_i^2 + y_i^2 + ax_i + by_i + c_m]^2$$

A closed form solution exists for determining a, b and $c_m$ for all m∈C that minimize Cost.

B.5 Circle(s)/Circular Arc(s) Estimation Constrained by a Given Radius

Figure 9:
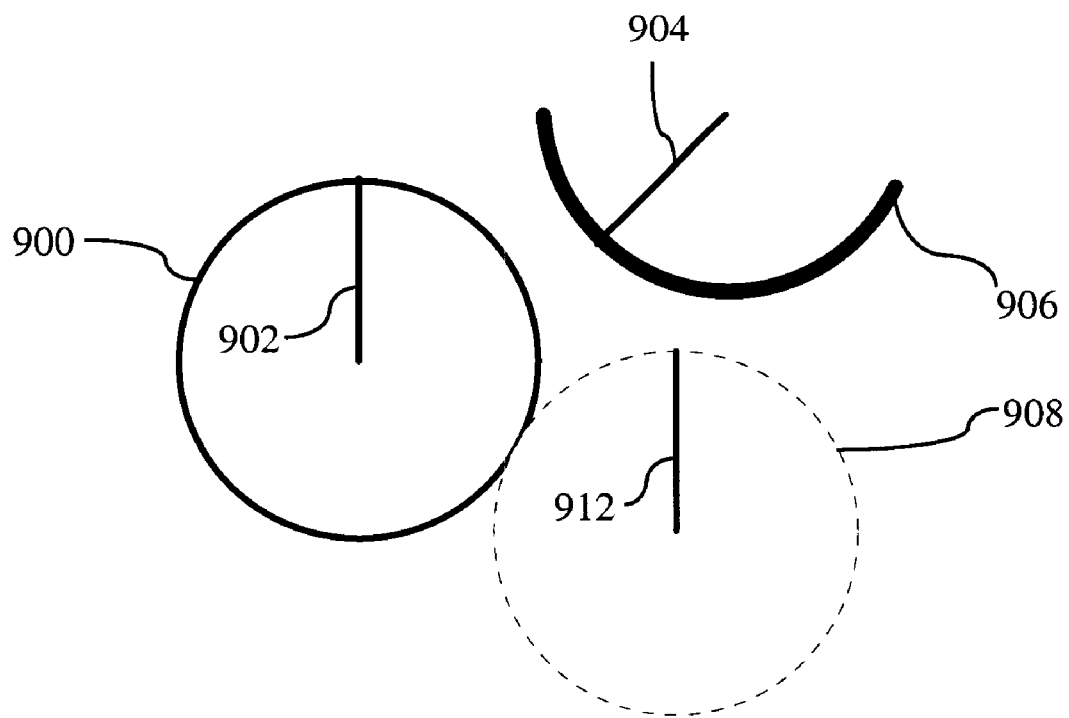
FIG. 9 shows two circles and a circular arc with a given radius r.

The structure constraint gives a fixed radius value r 902, 912, 904 for the circle(s) 900, 908/circular arc(s) 906 being estimated. The structure is shown in FIG. 9.

The estimate is to find centers $(x_{cm}, y_{cm})$ for each circle/circular arc $C_m$ in the set of circle(s)/circular arc(s), C, included in the estimation masks.

The cost function is $$Cost = \sum_{c_m \in C} \sum_{i \in C_m} w_i [(x_i - x_{cm})^2 + (y_i - y_{cm})^2 - r^2]^2$$

In one embodiment of the invention, an iterative optimization approach such as Newton-Rapson method is used to determine $(x_{cm}, y_{cm})$ for each circle/circular arc $C_m$ in the set of circle(s)/circular arc(s) that minimize Cost.

B.6 Circle(s)/Circular Arc(s) Estimation Constrained by Same Radius

The structure constraint requires that all circle(s)/circular arc(s) have the same yet unknown radius r. This structure is similar to that is shown in FIG. 9 with the exception that the common radius is unknown.

The cost function is $$Cost = \sum_{c_m \in C} \sum_{i \in C_m} w_i [(x_i - x_{cm})^2 + (y_i - y_{cm})^2 - d]^2$$

Where $d = r^2$.

Figure 10:
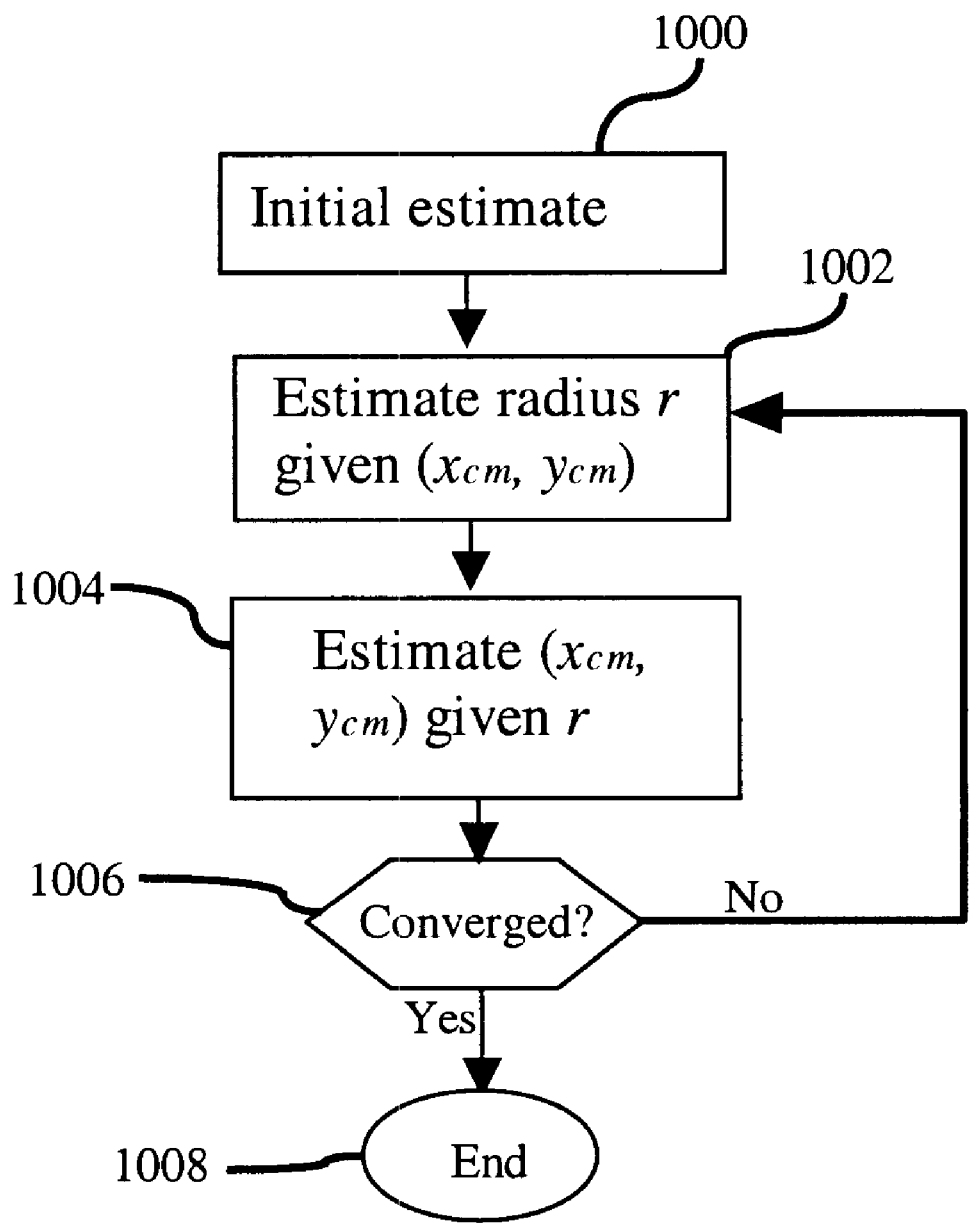
FIG. 10 shows an iterative optimization procedure to estimate ($x_{cm}$, $y_{cm}$) and the same radius r.

In one embodiment of the invention, an iterative optimization procedure is used to determine r and $(x_{cm}, y_{cm})$ for each circle/circular arc $C_m$ in the set of circle(s)/circular arc(s) that minimize Cost. The iterative optimization procedure is shown in FIG. 10. It starts with an initial estimate 1000 without any constraint and then estimates r given ($x_{cm}$, $y_{cm}$) 1002. This can be done using the method in section B.3. It then updates the estimate of ($x_{cm}$, $y_{cm}$) given r 1004 estimated from the previous step 1002. This can be done using the method in section B.5. The r and ($x_{cm}$, $y_{cm}$) estimation procedures can be repeated until the values converge 1006 and the process is completed 1008.

B.7 Circle(s)/Circular Arc(s) Estimation Constrained by a Given Radius and Centers on a Given Line The structure constraint gives a known radius value r 1102, 1110 for the circle(s) 1104, 1108/circular arc(s) 1106 included for the estimation. It also requires that the centers of the circle(s)/circular arc(s) 1112, 1114 are located on a given line 1100

$$dx+ey+f=0$$

Figure 11:
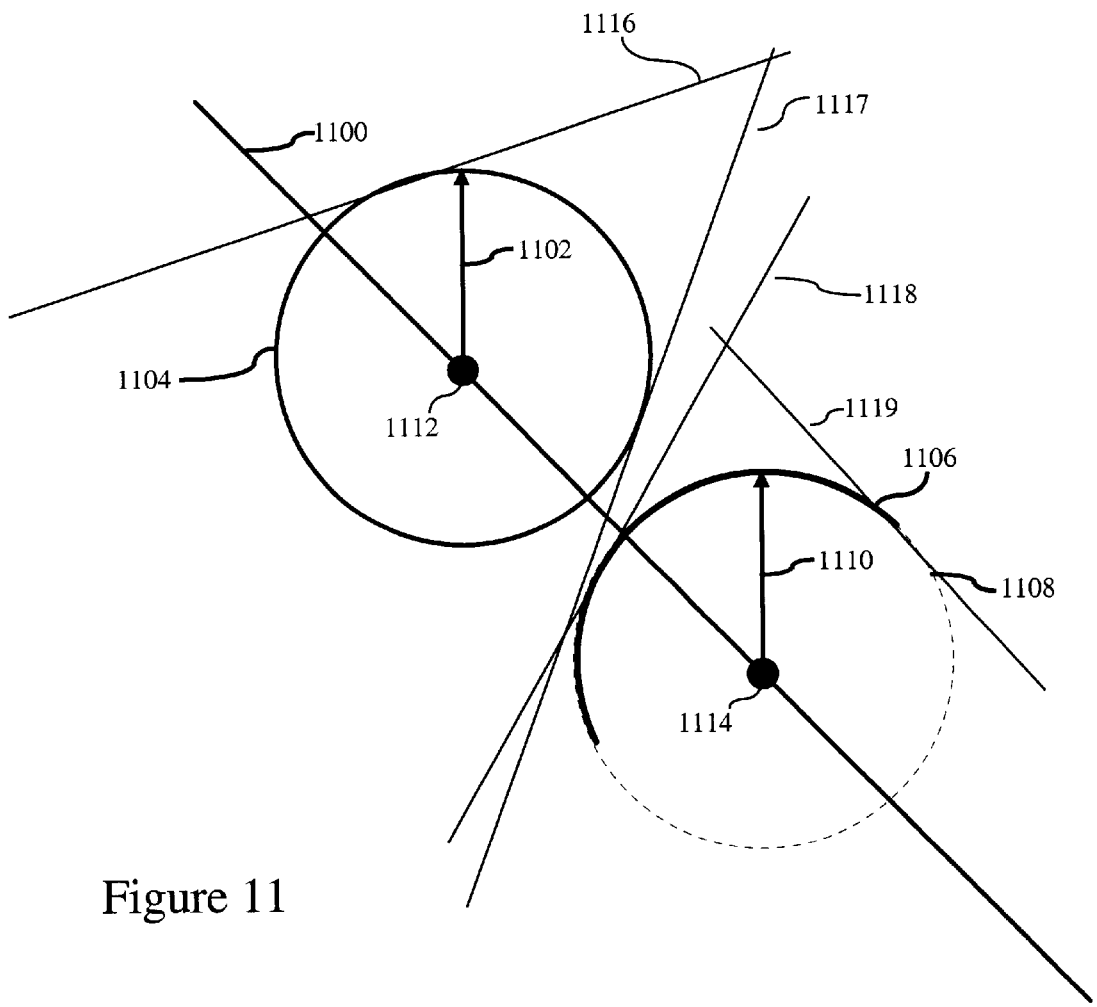
FIG. 11 shows a circle and a circular arc with a given radius r and centers on a given line.

The structure is illustrated in FIG. 11.
The cost function is $$Cost = \sum_{c_m \in C} \sum_{i \in C_m} w_i[(x_i - x_{cm})^2 + (y_i - y_{cm})^2 - r^2]^2 - \sum_{c_m \in C} \lambda_m(dx_{cm} + ey_{cm} + f)$$

In one embodiment of the invention, an iterative optimization approach such as Newton-Rapson method is used to determine ($x_{cm}$, $y_{cm}$) for each circle/circular arc $C_m$ in the set of circle(s)/circular arc(s) that minimize Cost.

B.8 Circle(s)/Circular Arc(s) Estimation Constrained by a Same Radius and Centers on a Given Line The structure constraint requires a same yet unknown radius value r for the circle(s)/circular arc(s) included for the estimation. It also requires that the centers of the circle(s)/circular arc(s) are located on a given line $$dx+ey+f=0$$

This structure is similar to that is shown in FIG. 11 with the exception that the common radius is unknown.
The cost function is $$Cost = \sum_{c_m \in C} \sum_{i \in C_m} w_i[(x_i - x_{cm})^2 + (y_i - y_{cm})^2 - d]^2 - \sum_{c_m \in C} \lambda_m(dx_{cm} + ey_{cm} + f)$$

Where $d=r^2$.

Figure 12:
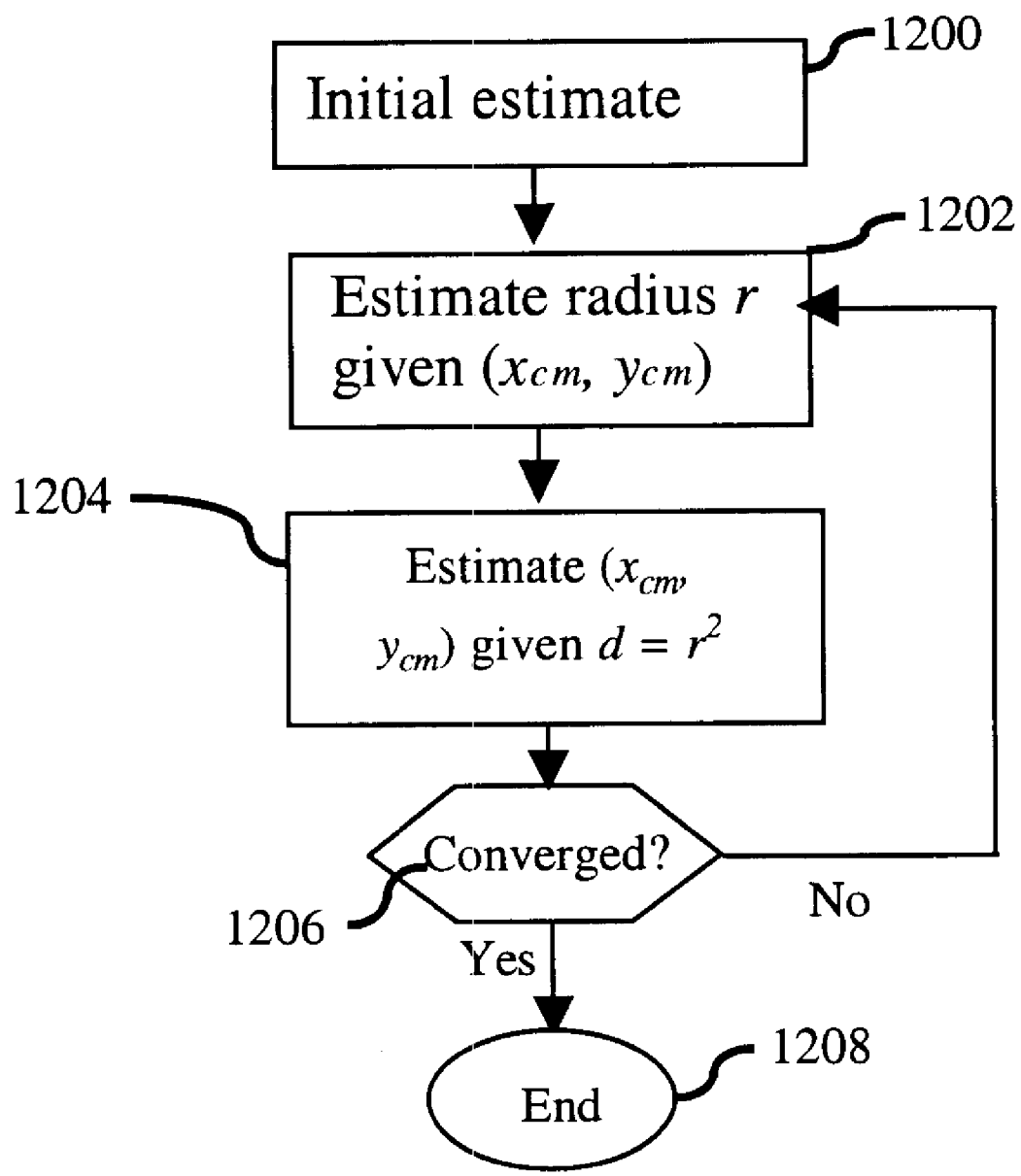
FIG. 12 shows an iterative optimization procedure to estimate ($x_{cm}$, $y_{cm}$) and the same radius r.

In one embodiment of the invention, an iterative optimization procedure is used to determine r and ($x_{cm}$, $y_{cm}$) for each circle/circular arc $C_m$ in the set of circle(s)/circular arc(s) that minimize Cost. The iterative optimization procedure is shown in FIG. 12. It starts with an initial estimate 1200 without any constraint and then estimates r given the initial estimate of ($x_{cm}$, $y_{cm}$) 1202. There is a closed form solution for this estimate. It then derives a new $d=r^2$ and updates the estimate of ($x_{cm}$, $y_{cm}$) given d 1204. This can be done using the method in section B.7. The r and ($x_{cm}$, $y_{cm}$) estimate procedures are repeated until the values converge 1206 and the procedure is completed 1208.

B.9 Circle(s)/Circular Arc(s) Estimation Constrained by a Given Tangential Line

The structure constraint gives a known tangential line $dx+ey+f=0$ 1116, 1118 for the circle(s)/circular arc(s) included for the estimation. The structure is illustrated in FIG. 11.

The cost function is $$Cost = \sum_{c_m \in C} \sum_{i \in C_m} w_i[(x_i - x_{cm})^2 + (y_i - y_{cm})^2 - (dx_{cm} + ey_{cm} + f)^2]^2$$

In one embodiment of the invention, an iterative optimization approach such as Newton-Rapson method is used to determine ($x_{cm}$, $y_{cm}$) for each circle/circular arc $C_m$ in the set of circle(s)/circular arc(s) that minimize Cost.

B.10 Circle(s)/Circular Arc(s) Estimation Constrained by a Given Tangential line and a Given Radius The structure constraint requires a known tangential line 1116, 1118 $dx+ey+f=0$ and the radius r 1102, 1110. The structure is illustrated in FIG. 11.

The cost function is $$Cost = \sum_{c_m \in C} \sum_{i \in C_m} w_i[(x_i - x_{cm})^2 + (y_i - y_{cm})^2 - r^2]^2 - \sum_{c_m \in C} [\lambda_m(dx_{cm} + ey_{cm} + f)^2 - r^2]$$

In one embodiment of the invention, an iterative optimization approach such as Newton-Rapson method is used to determine ($x_{cm}$, $y_{cm}$) for each circle/circular arc $C_m$ in the set of circle(s)/circular arc(s) that minimize Cost.

B.11 Circle(s)/Circular Arc(s) Estimation Constrained by a Given Tangential line and a Center Lies in a Line The structure constraint gives a known tangential line 1116, 1118

$$dx+ey+f=0$$

and the center pass through the line 1100 $px+qy+r=0$ for the circle(s)/circular arc(s) included for the estimation. The structure is illustrated in FIG. 11.

The cost function is $$Cost = \sum_{c_m \in C} \sum_{i \in C_m} w_i[(x_i - x_{cm})^2 + (y_i - y_{cm})^2 - (dx_{cm} + ey_{cm} + f)^2]^2 - \sum_{c_m \in C} \lambda_m(px_{cm} + qy_{cm} + r)$$

In one embodiment of the invention, an iterative optimization approach such as Newton-Rapson method is used to determine ($x_{cm}$, $y_{cm}$) for each circle/circular arc $C_m$ in the set of circle(s)/circular arc(s) that minimize Cost.

B.12 Circle(s)/Circular Arc(s) Estimation Constrained by Given Tangential Lines

The structure constraint gives two known tangential lines 1117, 1116

$$dx+ey+f=0$$

$$px+qy+r=0$$

for the circle 1104 included for the estimation. The structure is illustrated in FIG. 11. There are two steps to performing the estimation. Firstly, from two lines, we can calculate the middle line, and then using the method of B.11, Circle(s)/Circular Arc(s) Estimation Constrained by a Given Tangential line and a Center lies in a line.

Those skilled in the art should recognize that the estimation method of this invention can include other two dimensional curves such as ellipse, parabola, hyperbola, cubic and higher order polynomial functions, spline functions, etc. Pre-processing such as orthogonal, perspective or other projections can be conducted to transform from other coordinate systems to the image coordinate before the estimation. Furthermore, the structure-guided estimation of this invention can be generalized to estimate three dimensional or higher dimensional geometric entities by correlation of constraints among multiple images. Other types of cost function and estimation method can also be applied. For example, eigenvector fit rather than MSE fit can be used for estimation (Duda, R O and Hart P E, "Pattern Classification and Scene Analysis," John Wiley and Sons, New York, 1973, PP. 332–335.)

II.3 Robust Estimation

Figure 13:
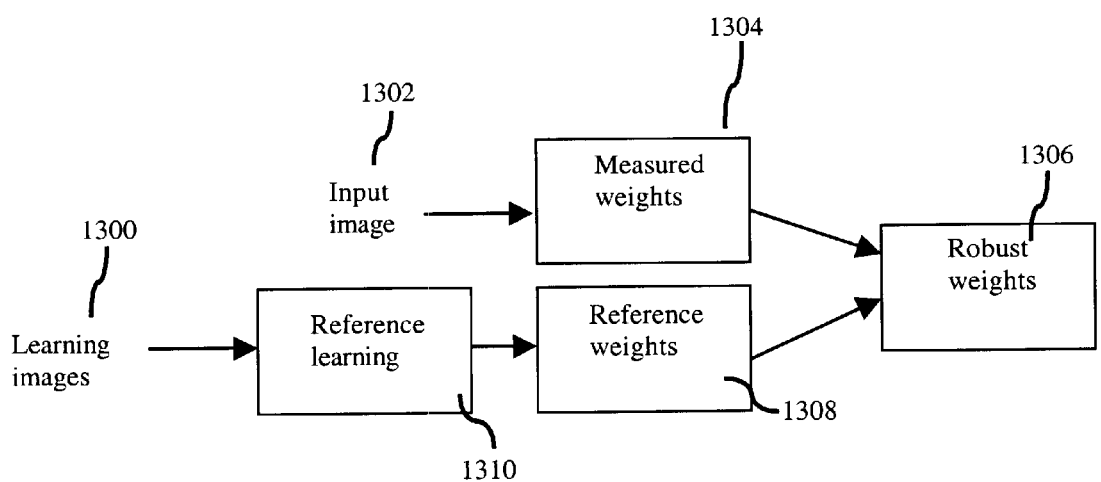
FIG. 13 shows a reference learning and robust weight generation process.

The structure-guided estimation uses structure constraints to resolve ambiguity and allows the use of more pixels (large n) for each estimation parameter. The estimation is based on two-dimensional weights that are derived from the image feature magnitude. Certain pixels in image feature region are more stable or contribute more to the result than others. The structure-guided estimation of this invention can improve the estimation robustness through automatic learning. As shown in FIG. 13, a reference learning process 1310 generates reference weights 1308 from the learning images 1300. The reference learning process disclosed in co-pending U.S. patent application Ser. No. 09/703018, "Automatic Referencing for Computer Vision Applications", by Shih-Jong J. Lee et. al, filed Oct. 31, 2000 which is incorporated in its entirety herein is used in one embodiment of the invention. The reference weights 1308 and the measured weights 1304 can be combined to form a robust weight image 1306 for estimation. In one embodiment of the invention, the combination is accomplished by a weighted average of the two images as follows:

$$I_{robust\ weight}(x_i, y_i) = \alpha(x_i, y_i) I_{measured\ weight}(x_i, y_i) + (1.0 - \alpha(x_i, y_i)) I_{reference\ weight}(x_i, y_i)$$

Other combination methods such as maximum, minimum, multiplication, etc. of the two images can be used according to the characteristics for the particular application.

Methods for using reference images are described in co-pending U.S. patent application Ser. No. 09/703018, "Automatic Referencing for Computer Vision Applications", by Shih-Jong J. Lee et. al, filed Oct. 31, 2000 incorporated herein in its entirety. In another embodiment of the invention, a reference weight deviation image is generated and the deviation image is used to normalize the measured weights by an image division that can be implemented by a Look up Table:

$$I_{robust\ weight}(x_i, y_i) = (\alpha(x_i, y_i) I_{measured\ weight}(x_i, y_i) + (1.0 - \alpha(x_i, y_i)) I_{reference\ weight}(x_i, y_i)) / I_{reference\ deviation}(x_i, y_i)$$

Figure 14:
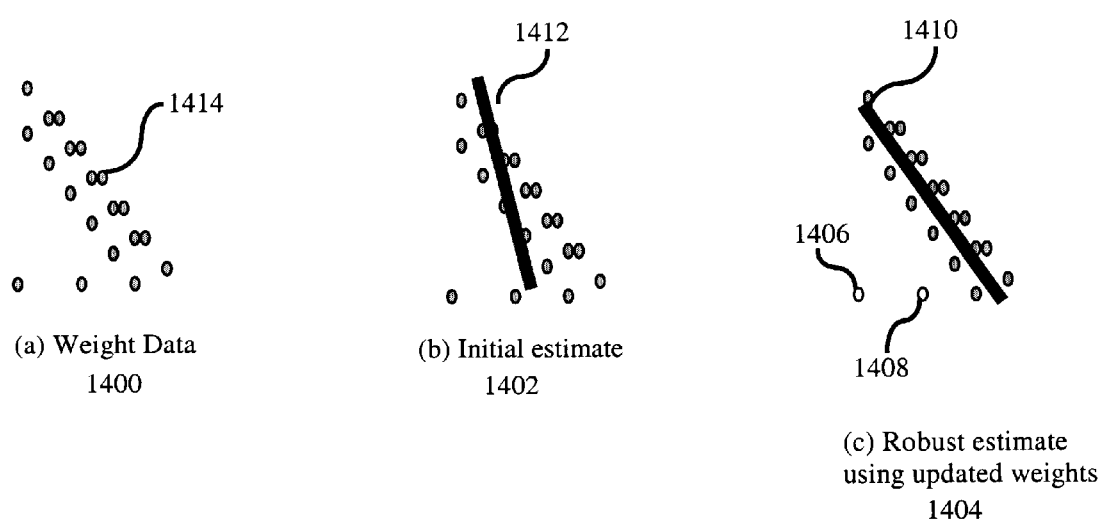
FIG. 14 illustrates one iteration of the robust estimation process.

Co-pending U.S. patent application Ser. No. 09/693723 entitled, "Image Processing System with Enhanced Processing and Memory Management", by Shih-Jong J. Lee et. al, filed Oct. 20, 2000 which is incorporated in its entirety herein describes Look Up Table methodology. In the structure-guided estimation process, the difference between the estimated geometric entities and the weight images can be used to generate scores that indicate the reliability of each point in the estimation mask. Guided by the scores, accuracy and repeatability can be further improved by a robust estimation method. FIG. 14 illustrates an example of the robust estimation process. FIG. 14(a) 1400 is the initial weight data within the estimation mask. FIG. 14(b) shows the initial estimation result 1412 superimposed on the original weight data 1414. Based on the initial estimation result, reliability scores are generated. In one embodiment of the invention, the reliability score for a point i can be derived as follows:

$$Score_i = \frac{w_i * \text{Model\_Error}(x_i, y_i)^2 * \sum_{m \in M} \sum_{i \in C_m} 1}{\sum_{m \in M} \sum_{i \in C_m} w_i [\text{Model\_Error}(x_i, y_i)]^2}$$

Using the reliability score, the weights can be updated to reduce weights for the lower score points. Reductions occur on weight data points 1406 and 1408 in the FIG. 14(c) example. A new estimation is performed using the updated weights and a new estimation result is generated 1410. The reliability score guided weight adjustment and estimation process is repeated until the estimation result converges or a maximum number of iterations is exceeded.

III. Structure-guided Measurements

After the structure-guided estimation, geometric entities are represented by their symbolic representations. Structure-guided measurements can be conducted using the symbolic representation of geometric entities. Measurements performed from the symbolic representation are not limited by image resolution or pixel quantization error and therefore can yield sub-pixel accuracy and repeatability.

In one embodiment of the invention, the measurements can be achieved by applying measurement rules to the estimated parameters of the symbolic representation of geometric entities. The following sections describe some measurement rules in one preferred embodiment of the invention.

Figure 15:
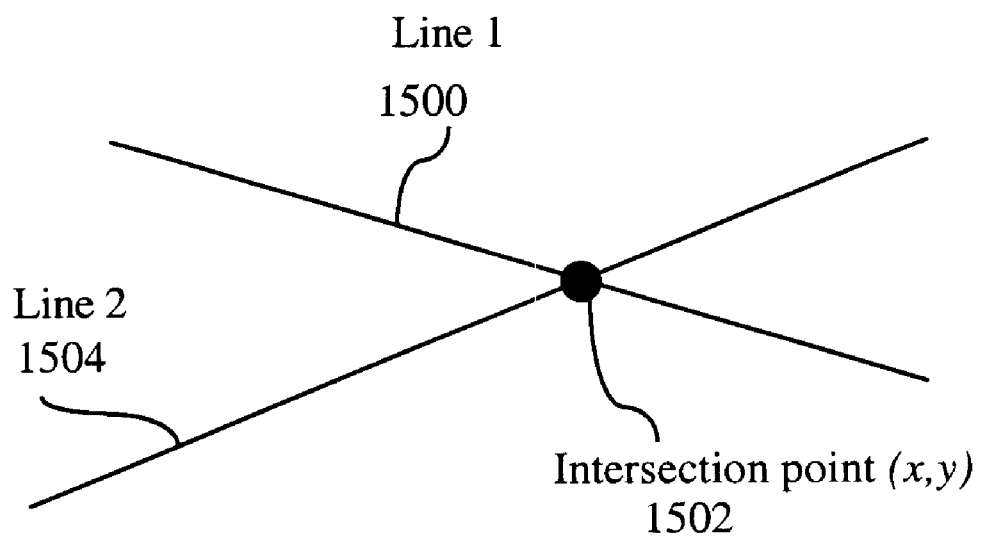
FIG. 15 illustrates the intersection point between two non-parallel lines.

III.1 Intersection Point Between Two Non-parallel Lines:

The intersection point to be determined is illustrated in FIG. 15. Let the two lines 1500, 1504 be represented as $$a_1 x + b_1 y + c_1 = 0$$

$$a_2 x + b_2 y + c_2 = 0$$

The intersection point (x, y) 1502 between the two lines can be determined by the following rule:

$$x = \frac{b_1 c_2 - b_2 c_1}{a_1 b_2 - a_2 b_1}$$

$$y = \frac{a_2 c_1 - a_1 c_2}{a_1 b_2 - a_2 b_1}$$

Figure 16:
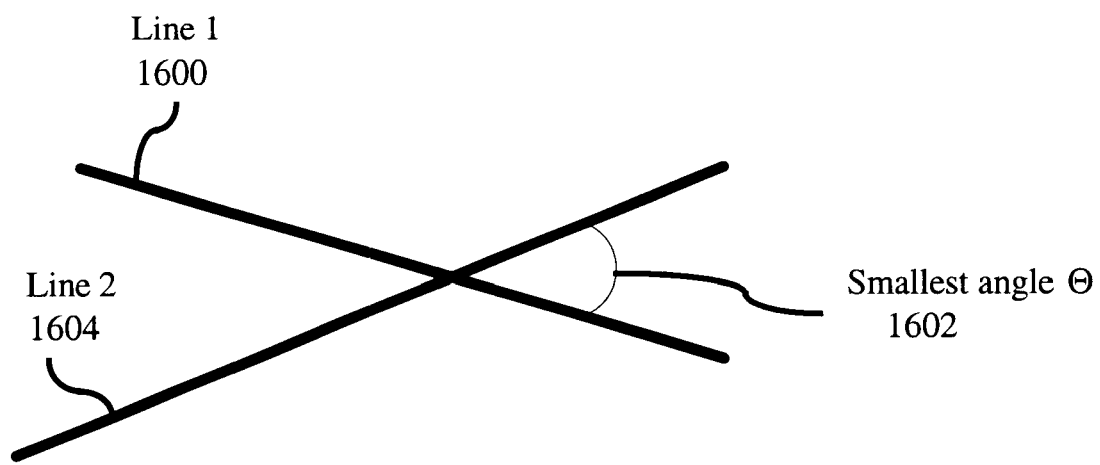
FIG. 16 illustrates the angle between two non-parallel lines.

III.2 Smallest Angle Between Two Non-parallel Lines:

The angle to be determined 1602 is illustrated in FIG. 16. Let the two lines 1600, 1604 be represented as $$a_1 x + b_1 y + c_1 = 0$$

$$a_2 x + b_2 y + c_2 = 0$$

The smallest angle $\Theta$ between the two lines can be determined from the following rule:

$$\Theta = \cos^{-1} \frac{|a_1 a_2 + b_1 b_2|}{\sqrt{a_1^2 + b_1^2} \sqrt{a_2^2 + b_2^2}}$$

Figure 17:
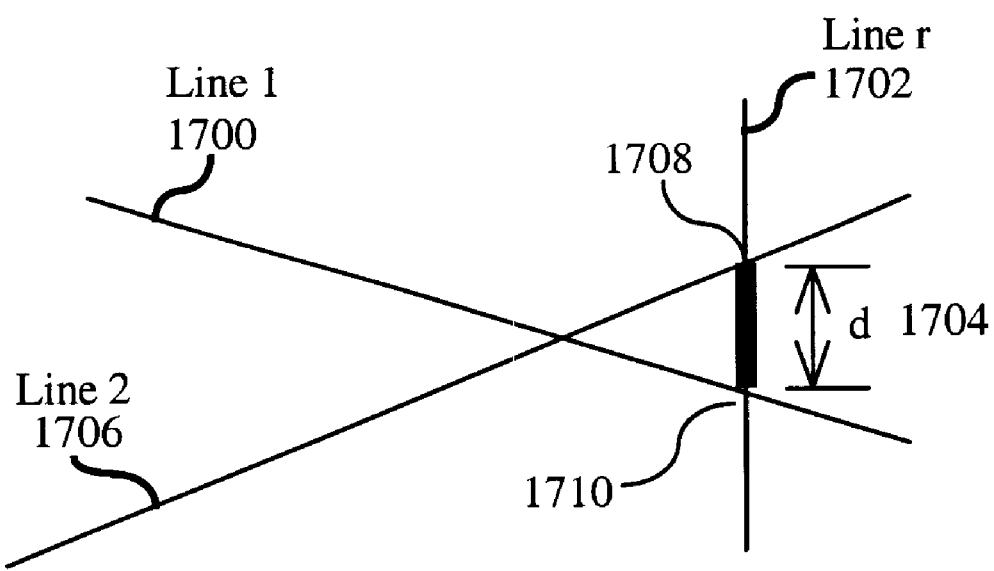
FIG. 17 illustrates distance between two non-parallel lines intersected by a reference line.

III.3 Distance Between Two Non-parallel Lines Intersected by a Reference Line:

The distance to be determined 1704 is illustrated in FIG. 17. Let the two lines 1700, 1706 be represented as Line 1: $a_1 x + b_1 y + c_1 = 0$ Line 2: $a_2 x + b_2 y + c_2 = 0$, and the reference line 1702 be represented by $$\text{Line } r: a_r x + b_r y + c_r = 0$$

Let the intersection between line 1 and line r 1710 be $(x_1, y_1)$ and the intersection between line 2 and line r 1708 be $(x_2, y_2)$. The distance d 1704 can be determined from the following rule:

$$d = \sqrt{(x_2-x_1)^2 + (y_2-y_1)^2}$$

Figure 18:
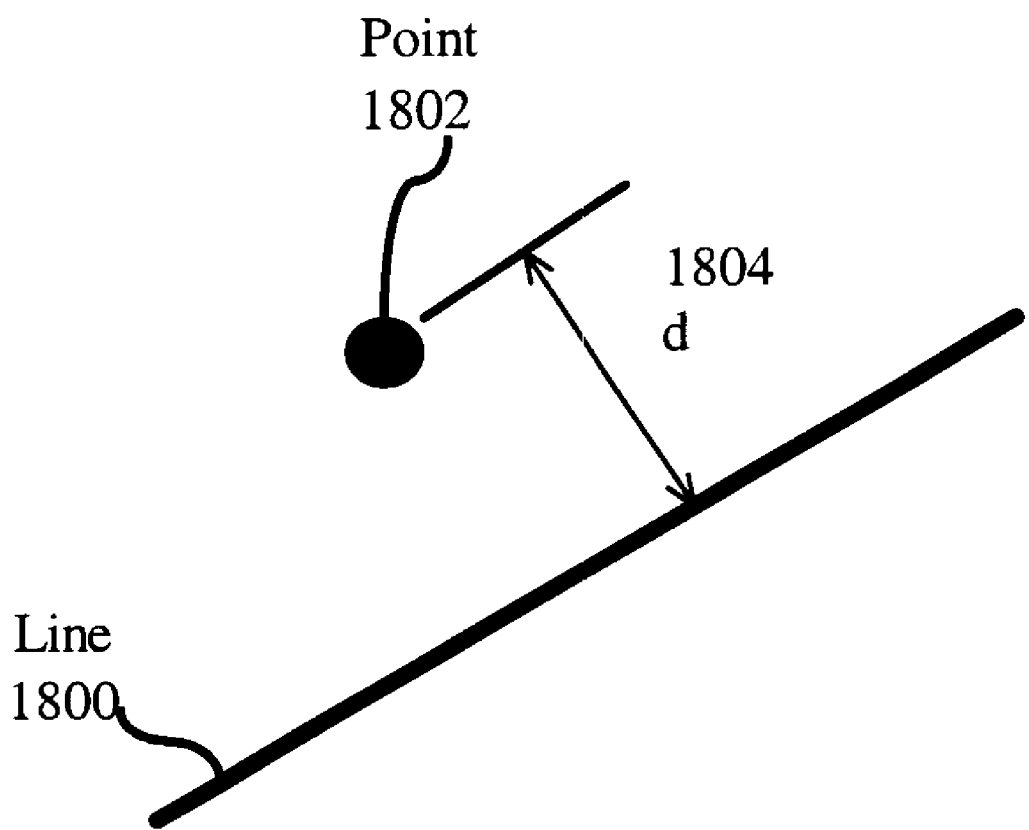
FIG. 18 illustrates the distance between a point and a line.

III.4 Shortest Distance Between a Point and a Line:

The shortest distance 1804 between a point 1802 and a line 1800 is illustrated in FIG. 18.

Let the line be $$ax + by + c = 0$$

and the point be $(x_0, y_0)$

The shortest distance d between the point and the line is $$d = \frac{|ax_0 + by_0 + c|}{\sqrt{a^2 + b^2}}$$

Figure 19:
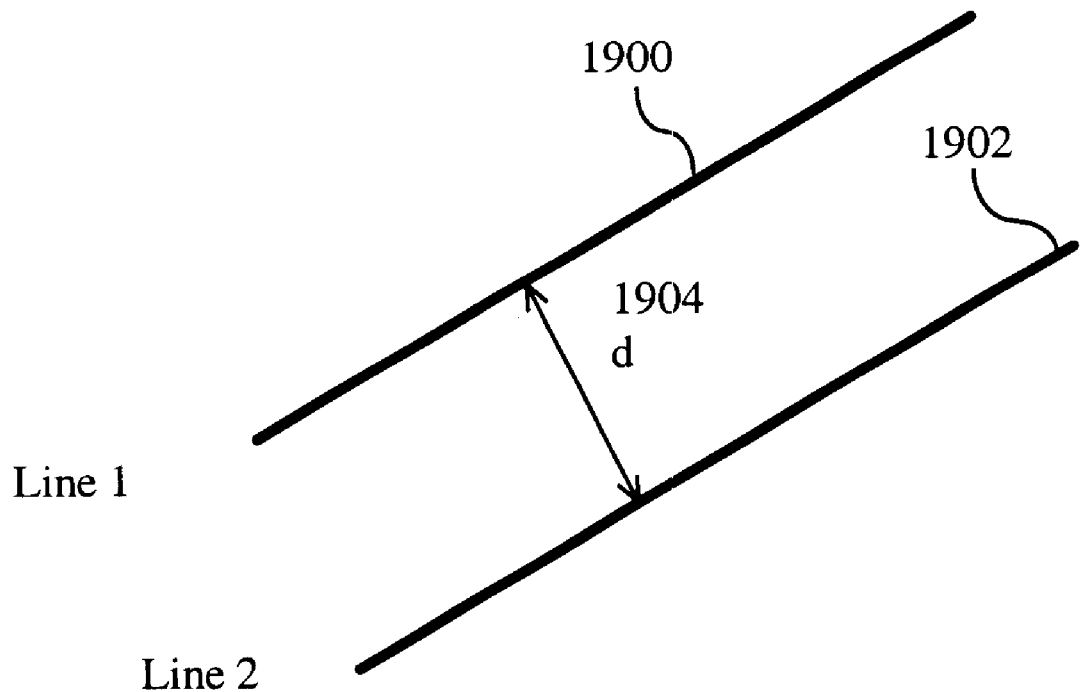
FIG. 19 illustrates the distance between two parallel lines.

III.5 Distance Between Two Parallel Lines:

The distance d 1904 between two parallel lines 1900, 1902 is illustrated in FIG. 19.

Let the two lines be $$ax + by + c_1 = 0 \text{ and}$$

$$ax + by + c_2 = 0.$$

The distance d between the two parallel lines is $$d = \frac{|c_1 - c_2|}{\sqrt{a^2 + b^2}}$$

Figure 20:
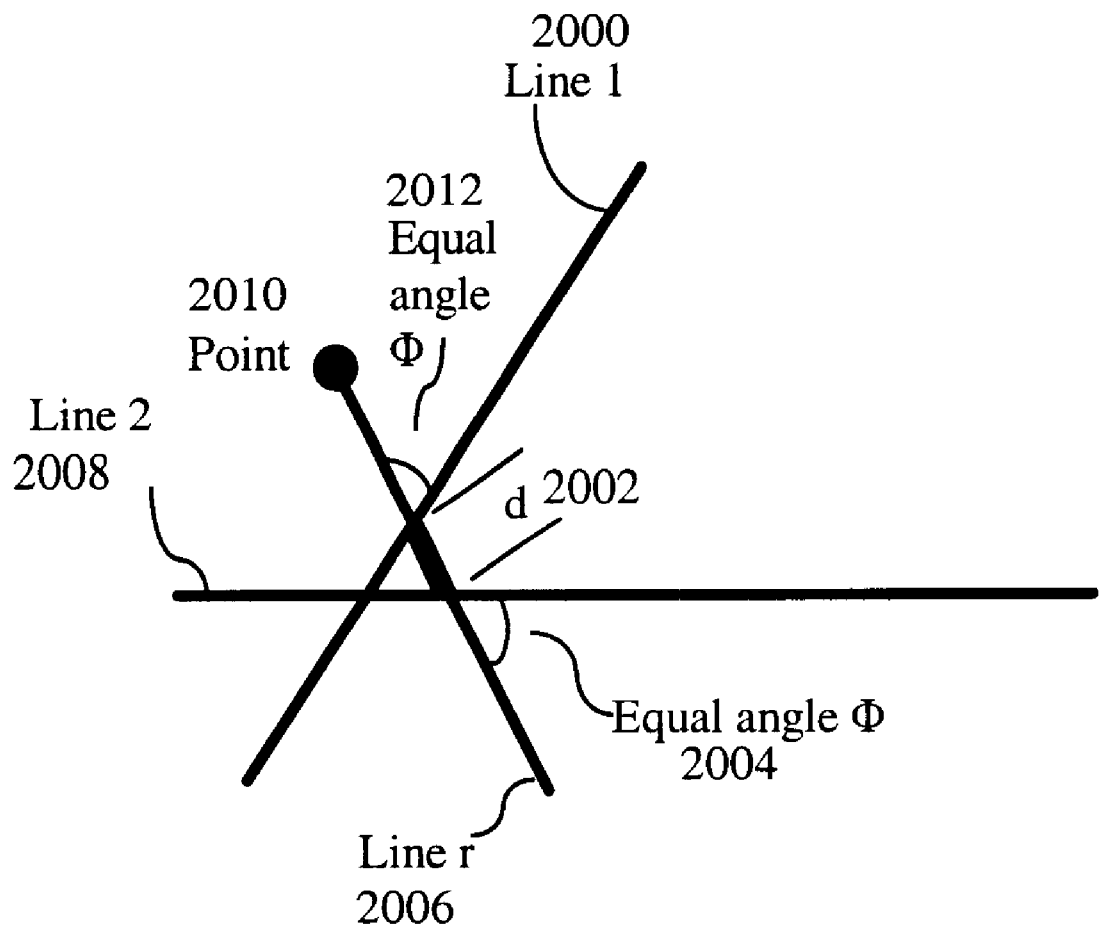
FIG. 20 illustrates the distance between two non-parallel lines at an equal angle intersection line passing a given point.

III.6 Distance Between Two Non-parallel Lines at an Equal Angle Intersection Line Passing a Given Point:

The distance 2002 between two non-parallel lines 2000, 2008 at an equal angle 2012, 2004 intersection line 2006 passing a given point 2010 is illustrated in FIG. 20.

Let the two lines be $$\text{Line 1: } a_1 x + b_1 y + c_1 = 0 \text{ and}$$

$$\text{Line 2: } a_2 x + b_2 y + c_2 = 0.$$

The given point 2010 is $(x_r, y_r)$ and the intersection line is $$\text{Line } r: a(x-x_r) + b(y-y_r) = 0$$

The equal angle constraint requires $$|aa_1 + bb_1| = |aa_2 + bb_2|.$$

With this constraint, the slope a and b of the intersection line can be solved using known parameters $a_1, b_1, a_2, b_2, x_r, y_r$.

The distance d between the two non-parallel lines can then be determined with the rules defined in section III.3.

Figure 21:
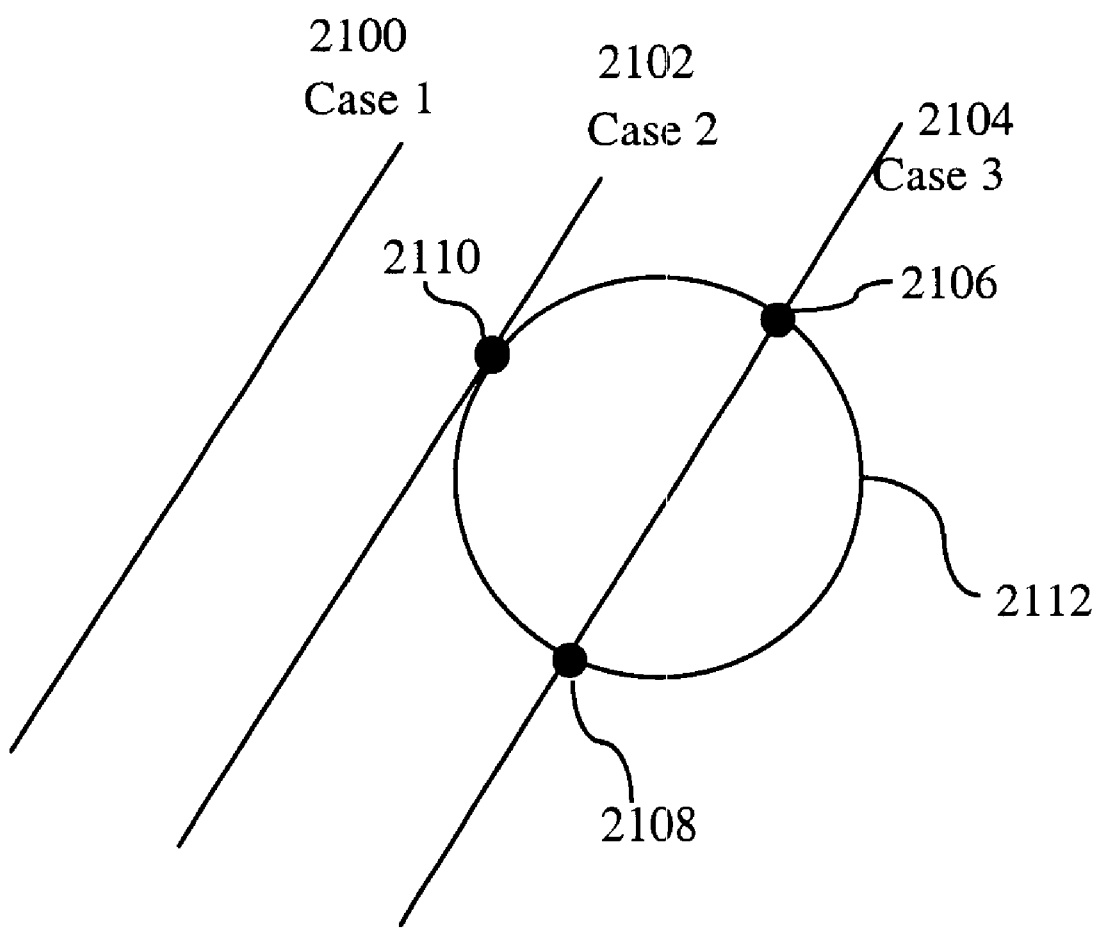
FIG. 21 illustrates intersection points between a line and a circle.

III.7 Intersection Points Between a Line and a Circle:

The intersection points 2110, 2106, 2108 between a line 2100, 2102, 2104 and a circle 2112 is illustrated in FIG. 21.

Let the line representation be $$ax + by + c = 0$$

and the circle representation be $$(x - x_c)^2 + (y - y_c)^2 - r^2 = 0$$

Let $$D = a x_c + b y_c + c$$

There are three cases:

Case 1: $|D| > r$
No intersection

Case 2: $|D| = r$
One intersection point at $(x_c - aD, y_c - bD)$

Case 3: $|D| < r$
Two intersection points at $(x_c - aD + b\sqrt{r^2 - D^2}, y_c - bD - a\sqrt{r^2 - D^2})$ and $(x_c - aD - b\sqrt{r^2 - D^2}, y_c - bD + a\sqrt{r^2 - D^2})$

Figure 22:
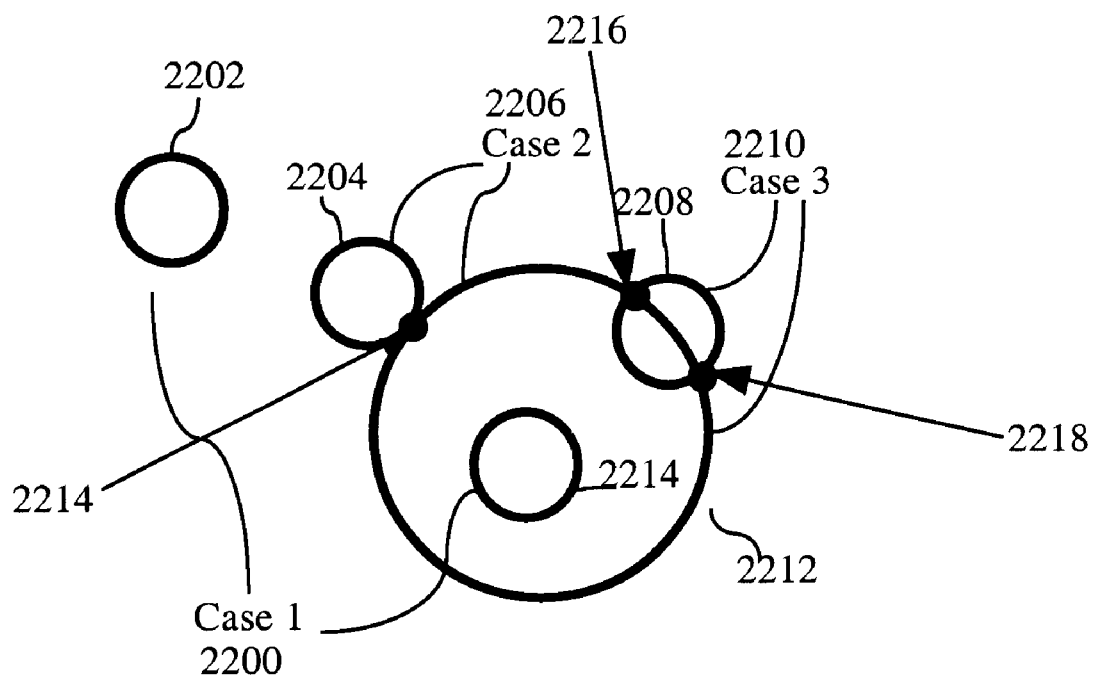
FIG. 22 illustrates intersection points between two circles.

III.8 Intersection Points Between Two Circles:

The intersection points between two circles is illustrated in FIG. 22 for three cases. Case 1 2200 is for non-intersection circles 2202 and 2214; case 2 2206 involves two circles 2204, 2212 that have a single point of intersection 2214; case 3 2210 involves two circles 2208, 2212 having two points of intersection 2216, 2218.

Let the two circle representations be $$(x - x_1)^2 + (y - y_1)^2 = r_1^2$$

$$(x - x_2)^2 + (y - y_2)^2 = r_2^2$$

The line passes through the intersection point(s) of the circles is $$ax + by + c = 0$$

Where $$a = 2(x_2 - x_1),$$

$$b = 2(y_2 - y_1) \text{ and}$$

$$c = x_1^2 - x_2^2 + y_1^2 - y_2^2 - r_1^2 + r_2^2$$

The rule in III.7 can be applied to find the intersection points between $ax + by + c = 0$ and $$(x - x_1)^2 + (y - y_1)^2 = r_1^2$$

Figure 23:
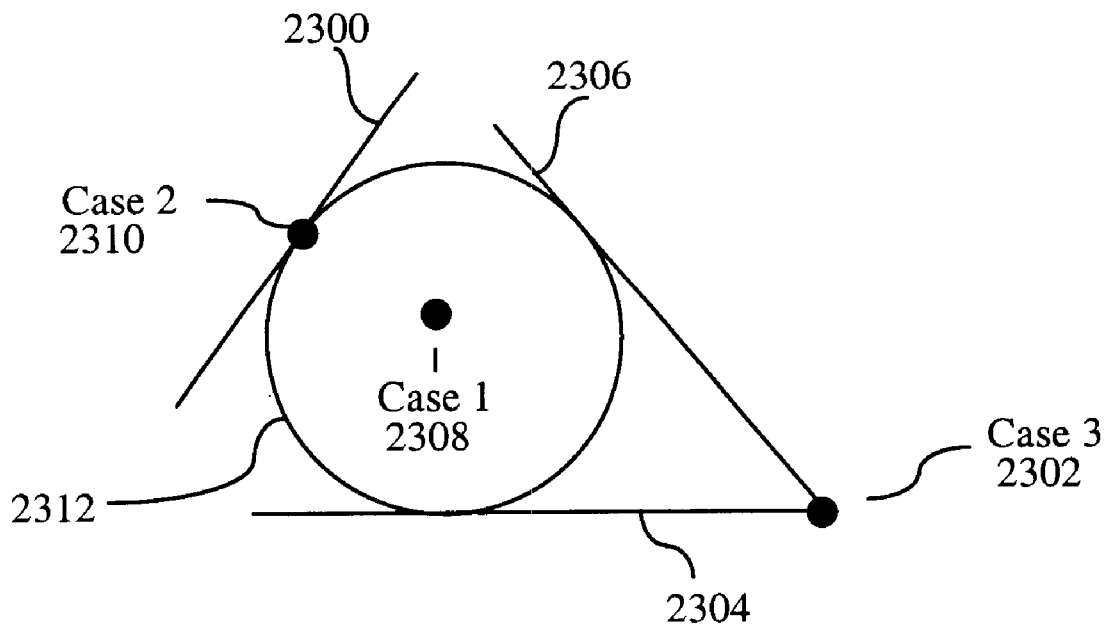
FIG. 23 illustrates tangential lines of a circle and a given point.

III.9 Tangential Lines of a Circle and a Given Point:

The tangential lines of a circle and a given point is illustrated in FIG. 23. Case 1 2308 shows the situation where a tangential line does not exist. Case 2 shows line 2300 tangent to circle 2312 at a single point 2310. Case 3 shows two lines 2306, 2304 tangent to circle 2312 at two points with the two lines having an intersection at 2302

Let the circle representation be $$(x - x_c)^2 + (y - y_c)^2 = r^2$$

the point be $(x_p, y_p)$

We define the tangential line as $$a(x - x_p) + b(y - y_p) = 0, \; a^2 + b^2 = 1$$

$$D^2 = (x_c - x_p)^2 + (y_c - y_p)^2$$

Let

Case 1: $D^2 < r^2$
Tangential line does not exist

Case 2: $D^2 = r^2$

One tangential line exists and is defined as follows:

$$a = \frac{x_c - x_p}{r}$$

$$b = \frac{y_c - y_p}{r}$$

Case 3: $D^2 > r^2$

Two tangential lines exist. The first line is defined as follows:

$$a = \frac{r(x_c - x_p) + (y_c - y_p)\sqrt{D^2 - r^2}}{D^2}$$

$$b = \frac{r(y_c - y_p) - (x_c - x_p)\sqrt{D^2 - r^2}}{D^2}$$

The second line is defined as follows:

$$a = \frac{r(x_c - x_p) - (y_c - y_p)\sqrt{D^2 - r^2}}{D^2}$$

$$b = \frac{r(y_c - y_p) + (x_c - x_p)\sqrt{D^2 - r^2}}{D^2}$$

Those skilled in the art should recognize that the measurement method of this invention can include other two dimensional measurements and the method can be generalized to three dimensional or higher dimensional measurements of geometric entities.

The invention has been described herein in considerable detail in order to comply with the Patent Statutes and to provide those skilled in the art with the information needed to apply the novel principles and to construct and use such specialized components as are required. However, it is to be understood that the inventions can be carried out by specifically different equipment and devices, and that various modifications, both as to the equipment details and operating procedures, can be accomplished without departing from the scope of the invention itself.

What is claimed is:

1. A structure-guided image estimation method comprising the steps of:
    a) receiving a measurement mask;
    b) receiving a measurement weight image;
    c) Inputting at least one structure constraint;
    d) Performing at least one estimation from the weight image within the region defined by the measurement mask using the at least one structure constraint and
    e) generate a symbolic representation output of a geometric entity.

2. The method of claim 1 further comprises a structure-guided measurement step.

3. The method of claim 1 further comprises a measurement mask generation step.

4. The system of claim 1 further comprises a measurement weight generation step.

5. A structure-guided estimation method comprising the steps of:
    a) inputting at least one symbolic representation of a geometric entity;
    b) inputting at least one structure constraint;
    c) performing parameter estimation of the symbolic representation using the at least one structure constraint.

6. The method of claim 5 wherein the symbolic representation of a geometric entity includes a point.

7. The method of claim 5 wherein the symbolic representation of a geometric entity includes a line.

8. The method of claim 5 wherein the symbolic representation of a geometric entity includes a circle.

9. The method of claim 5 wherein the parameter estimation includes a line estimation.

10. The method of claim 5 wherein the parameter estimation includes a circle estimation.

11. The method of claim 5 wherein the parameter estimation includes a circular arc estimation.

12. A robust weight estimation method comprising the steps of:
    a) receiving a plurality of learning images;
    b) performing reference learning to generate reference weights;
    c) receiving a measured weight image;
    d) combining the reference weight and measured weight images to produce an output weight image.

13. A robust estimation method comprising the steps of:
    a) receiving a measurement weight image;
    b) performing an initial estimate for an image feature;
    c) generating reliability scores from the measurement weight image and the initial estimate;
    d) updating the weight image using the reliability score;
    e) updating the initial estimate using the updated weight image.

14. A structure-guided measurement method comprising the step of:
    a) inputting at least one symbolic representation of a geometric entity;
    b) inputting at least one structure constraint;
    c) applying at least one measurement of the symbolic representation using the at least one structure constraint and
    d) generate at least one measurement output.

15. The method of claim 14 wherein the measurement includes the determination of an intersection point.

16. The method of claim 14 wherein the measurement includes the determination of an angle.

17. The method of claim 14 wherein the measurement includes the determination of the distance between a point and a line.

18. The method of claim 14 wherein the measurement includes the determination of the distance between two lines.

19. The method of claim 14 wherein the measurement includes the determination of the tangential line of a circle.

20. The method of claim 14 wherein the measurement includes the relative positions between two or more geometric entities.

* * * * *